United States Patent [19]

Tarves, Jr.

[11] Patent Number: 5,037,562
[45] Date of Patent: Aug. 6, 1991

[54] OIL/LIQUID DYNAMIC SEPARATION ROTATING DISK FILTER SYSTEM WITH BARRIER LAYER FORMATION

[76] Inventor: Robert J. Tarves, Jr., Cummings & Oak Aves., Blenheim, N.J. 08012

[21] Appl. No.: 543,144

[22] Filed: Jun. 25, 1990

Related U.S. Application Data

[63] Continuation of Ser. No. 643,075, Aug. 22, 1984, Pat. No. 4,936,986, which is a continuation-in-part of Ser. No. 559,744, Dec. 9, 1983, abandoned, which is a continuation of Ser. No. 400,259, Jul. 21, 1982, abandoned, which is a continuation-in-part of Ser. No. 365,836, Apr. 5, 1982, abandoned.

[51] Int. Cl.$^5$ ............................................. B01D 33/00
[52] U.S. Cl. ....................................... 210/780; 55/52; 210/781; 210/797
[58] Field of Search .............. 210/297, 321.64, 321.67, 210/321.68, 331, 347, 360.2, 496, 510.1, 780, 781, 791, 799, 789, 787, 188; 55/36, 52, 92

[56] References Cited

U.S. PATENT DOCUMENTS

| | | | |
|---|---|---|---|
| 1,219,796 | 3/1917 | Atkins | 210/360.2 |
| 3,437,208 | 4/1969 | Kaspar et al. | 210/297 |
| 3,997,447 | 12/1976 | Breton et al. | 219/360.2 |
| 4,186,100 | 1/1980 | Mott | 210/506 |
| 4,246,108 | 1/1981 | Croopnick et al. | 210/781 |
| 4,277,349 | 7/1981 | Schwinghammer | 210/797 |
| 4,624,784 | 11/1986 | Lefebvre | 210/321.67 |

FOREIGN PATENT DOCUMENTS

| | | | |
|---|---|---|---|
| 216529 | 8/1961 | Austria | 210/360.2 |
| 1143293 | 3/1983 | Canada | 210/496 |

OTHER PUBLICATIONS

Article–"16403-Fiber Filtration Disc", Smith, Research Disclosure–publication No. 164, 12-1977.
Article–"Desalination by Reverse Osmosis", Sherwood et al, publication by M.I.T., 2-1967.

*Primary Examiner*—Robert A. Dawson
*Assistant Examiner*—Joseph Drodge

[57] ABSTRACT

A nonclogging rotary disk filter is disclosed. The invention has relief holes provided in rotatable disks such that oil, other liquids, and gases may be separated from a liquid while the discs are rotated at high speeds. The relief holes are located close to the rotatable shaft supporting the disks. When the disks are rotated at high speeds, ligher liquids, oil, and gas bubbles tend to migrate to the area near the shaft which has relatively low centrifugal forces. In a gravitational field, the relief holes allow the lighter liquids, oil, and gas bubbles to migrate upwardly through the disks for removal. The disks are rotated fast enough to establish a barrier layer in a liquid over a working area of the disk surface having a surface velocity greater than 15 feet per second.

4 Claims, 2 Drawing Sheets

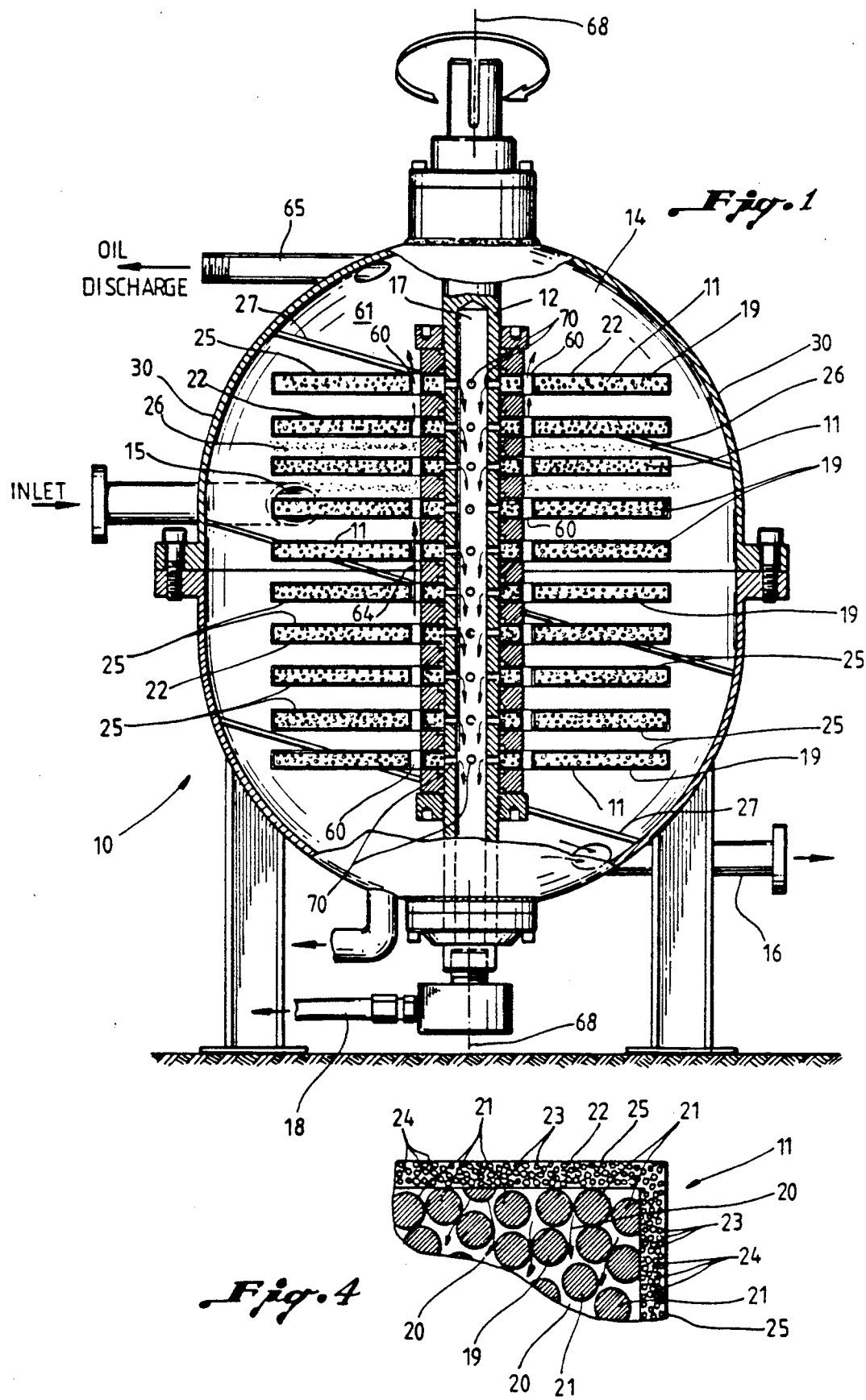

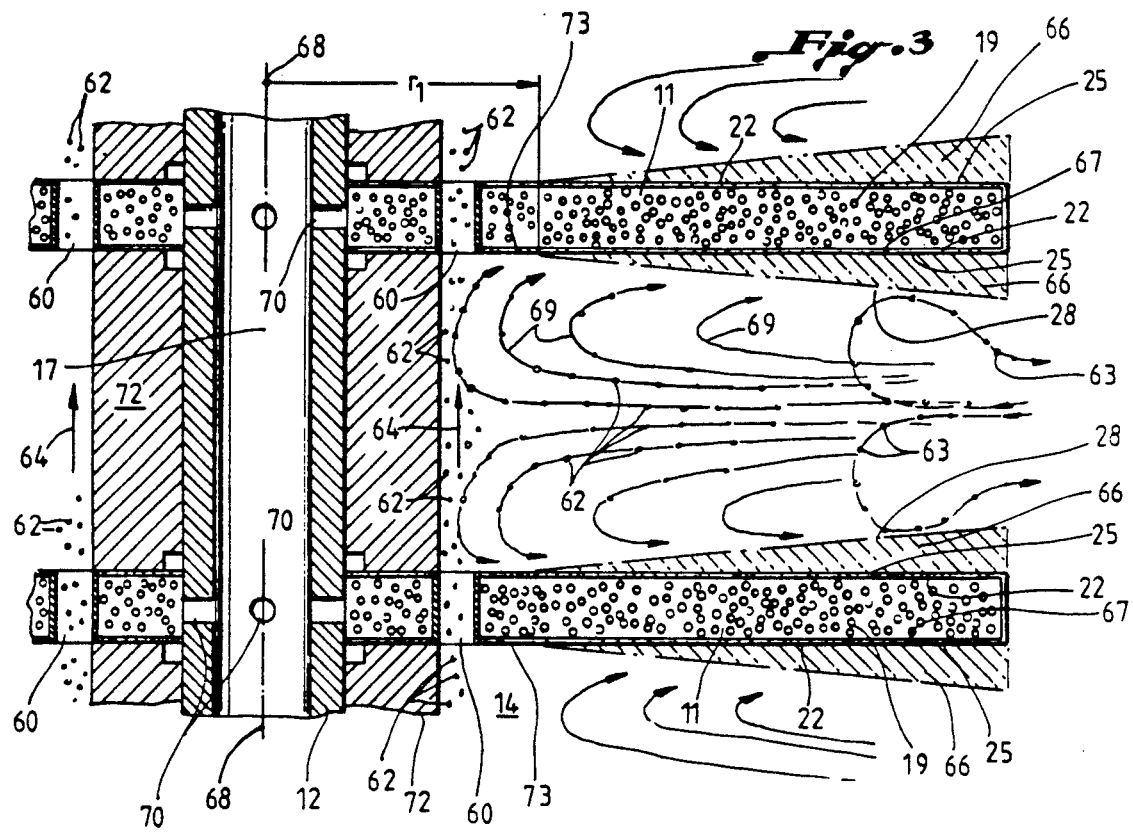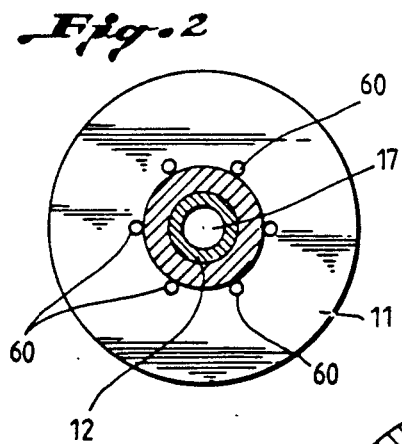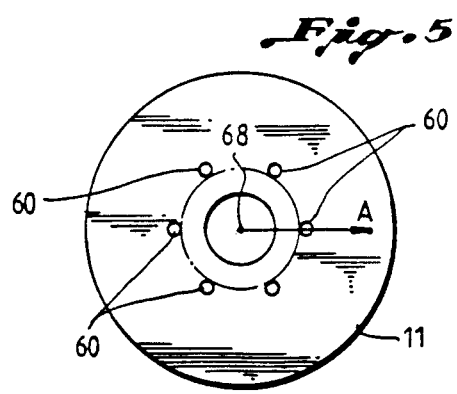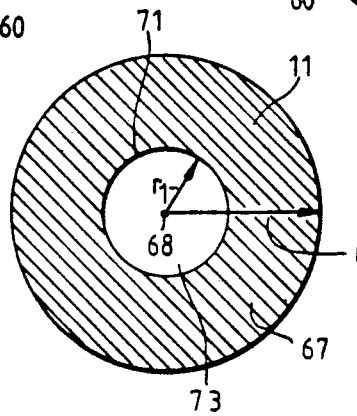

5,037,562

OIL/LIQUID DYNAMIC SEPARATION ROTATING DISK FILTER SYSTEM WITH BARRIER LAYER FORMATION

CROSS-REFERENCE TO RELATED APPLICATIONS

This is a continuation of application Ser. No. 643,075, filed Aug. 22, 2984 (now U.S. Pat. No. 4,936,986, issued June 26, 1990); which was a continuation-in-part of application Ser. No. 559,744, filed Dec. 9, 1983 (now abandoned); which was a continuation of application Ser. No. 400,259, filed July 21, 1982 (now abandoned); which was a continuation-in-part of application Ser. No. 365,836, filed Apr. 5, 1982 (now abandoned); the disclosures of which are incorporated by reference.

BACKGROUND OF THE INVENTION

This invention relates generally to filters used for ultrafiltration of slurry mixtures which also require separation of oil, other liquids, or gas from the slurry to be filtered. This invention more specifically involves a high-speed rotary disk filter made from sintered particles, where the filter disks have expungement passageways.

Ultrafiltration, sometimes referred to as hyperfiltration, involves the removal from a fluid of particles having a size on the order of 10 microns or less. Conventional filters utilizing filter elements such as wire mesh are not suitable for ultrafiltration. Satisfactory wire meshes are generally not available at 10 microns and below because of the small size and the difficulty in achieving uniform spacing.

Applicant's own application Ser. No. 559,744, filed Dec. 9, 1983, discloses a nonclogging high speed rotary disk filter for ultrafiltration. That invention avoids the problem of clogging which has plagued conventional filters used in ultrafiltration applications. Several porous disks were provided on a hollow rotatable shaft. Filtrate would be introduced into a tank containing the disks rotating at high speed. Filtered fluid flowed through the disks, into the hollow shaft, and out a conduit for removal, while the fluid to be filtered continued to be circulated in the tank.

Applicant's rotary disk filter is rotated at high speeds sufficient to establish a boundary layer or barrier layer in the fluid itself, which inhibits the migration of small particles from the slurry into the filter element. When the shaft is rotated at an appropriate speed, the barrier layer created adjacent to the exterior surface of the filter disks effectively shields the surface from the particles. The particles are inhibited from crossing the barrier layer which was established in the fluid near the surface of the filter disk. In applicant's high-speed rotary disk filter, much of the filtering action occurs at the barrier layer in the fluid, and not in the filter element itself. This avoids the problem of clogging. The problem of clogging has plagued the prior art where small undesired particles from the fluid typically collect to form a cake on conventional filters. The cake of particles is usually sufficient to severely reduce or completely block the flow of fluid through the filter element. This typically resulted in expensive down time to clean the filter, as well as expensive maintenance and cleaning operations.

Significantly, by creating a barrier layer, Applicant's high speed rotary disk filter avoids the requirement of frequently interrupting filtering by backpulsing the filtrate. A rotary disk filter has been proposed by Breton et al. in U.S. Pat. No. 3,997,447. But Breton et al. provided that at predetermined intervals the fluid flow through the filter must be reversed or backpulsed. Breton et al. failed to discover the dramatic advantages achievable when a barrier layer is created. Breton et al. used disks that were too small (2 inches in diameter) and which were rotated too slow (1325 rpm in liquid) to create a barrier layer. In fact, the frequent backpulsing taught by Breton et al. would create turbulence that would destroy a barrier layer. Breton et al. creates turbulence; Applicant's high speed rotary disk filter avoids it.

The design of Applicant's rotary disk filter is such that for a given flow rate, the size, weight, and space requirements are considerably reduced when compared to conventional filters. The economic benefits of Applicant's rotary disk filter are achieved by reducing pumping requirements, eliminating cartridge or filter element replacement, minimizing clogging, expensive down time and the need for backpulsing to clean the filter element, and improving the quality of filtration.

Applicant's rotary disk filter was originally intended to be operated in a horizontal position; that is, the axis upon which the rotary disk filter was rotated would generally lie in a horizontal plane.

Applicant discovered that by providing relief holes through the disk, and by operating the rotary disk filter in a vertical position, oil, some other liquids, and gaseous matter could be removed from a slurry during filtration. To Applicant, this discovery was unexpected and surprising.

In the past, oil and water suspensions have been separated by centrifuges. Centrifuges have been inconsistent in separating stable emulsions. If the concentration of oil and water varies in the input feed stream, a centrifuge would require continual readjustment for efficient separation. A centrifuge normally depends upon there being a significant difference between the densities of two liquids being separated. A centrifuge typically will not work well if the densities of the two liquids is nearly equal.

A stationary cross flow filter, such as provided in Applicant's prior application Ser. No. 365,836, may be used to separate water from oil mixtures by first wetting the porous filter with water. The oil and water mixture must be passed at a high velocity, under pressure, over the porous filter membrane. Generally low pressure must be used, because excessive pressure will cause both oil and water to pass through the filter. This low pressure results in low flow rates of filtered water. Much energy must be expended in a typical cross-flow filter to pump an adequate volume of liquid necessary to sustain the high velocity of flow across the filter membrane which is essential to filtration. Only a small portion of the total flow actually passes through the filter. Such a process is inefficient.

A critical range of several parameters should be observed in order to maximize the advantages of the present invention.

The present invention rotates porous disks through the filtrate. The surface velocity of the rotating disks must exceed a certain lower limit in order to achieve proper operation. A series of holes or slots are located along the vertical shaft that supports the disks. The disks are spaced an appropriate distance apart, preferably ⅜ inch. The disks are rotated at speeds in the range of 500 to 1000 rpm, based on a 12 inch diameter disk, to achieve a minimum disk surface velocity of at least 15 feet per second over a major portion of the disk surface. This is necessary to establish a barrier layer in the fluid to be filtered.

The oil that is more intimately bound in the water phase enters into the area between the disks. Centrifugal forces, and shear forces at the barrier layer, assist the coalescence of small droplets by reducing surface tension. These forces act to cause the lighter oil droplets to migrate toward the shaft. More dense fluids migrate toward the walls of the tank. The oil droplets, due to their lower specific gravity and buoyancy, rise or migrate along the shaft through the relief holes in the disks. The oil is discharged from the top of the tank. The relief holes are as close as possible to the shaft, where the radial velocity of rotation is smallest.

A pressure differential is applied between the hollow shaft and the tank. This pressure differential encourages water to diffuse across the barrier layer and into the filter disks. But the pressure should remain within an appropriate range. If the pressure is too great, oil may be forced into the filter.

The speed of rotation of the disks and the size of the disks are interrelated factors that are critical. If the disks are too small, they will not achieve enough surface velocity to establish a barrier layer or the shear forces necessary for oil and water separation. This may be partially compensated by higher rotational speeds to achieve greater surface velocity at a given diameter, but there are limits beyond which this cannot be done.

Thus, the invention requires the use of oil relief holes in porous disks mounted upon a vertical shaft, under critical ranges of pressure, rotational speed, disk size, and disk spacing.

A rotary disk filter constructed in accordance with the present invention allows ultrafiltration to be performed upon a slurry, while at the same time removing oil, some other liquids, and gaseous matter from the slurry. A rotary disk filter constructed in accordance with the present invention minimizes clogging, minimizes expensive down time, substantially eliminates cartridge or filter element replacement, reduces pumping requirements, minimizes back pressure, and substantially minimizes the need for backpulsing to clean the filter element. Such a filter can efficiently handle variable concentrations of oil and water, for example, without adjustment. The filter will separate two liquids which have densities that are close to each other. The filter will handle small concentrations of fluid to be filtered. Other features and advantages of the present invention will become apparent from the following detailed description of a presently preferred embodiment.

BRIEF DESCRIPTION OF THE DRAWINGS

FIG. 1 depicts a partially cutaway front view of a rotary disk filter constructed in accordance with the present invention.

FIG. 2 shows a top view of a single rotary disk utilized in the rotary disk filter, illustrating the expungement passageways provided through the disk.

FIG. 3 depicts an enlarged partially schematic cross-sectional view of the area between two filter disks, illustrating the flow of oil droplets under optimum operating conditions.

FIG. 4 depicts an enlarged cross-sectional view of a section of a filter disk.

FIG. 5 is a schematic illustration of a disk for purposes of explaining the relationship of radial distance to surface velocity.

FIG. 6 is a schematic illustration of a disk showing the critical radius beyond which a barrier layer is established.

DETAILED DESCRIPTION OF A PREFERRED EMBODIMENT

Many of the details of the construction of a rotary disk filter are disclosed in application Ser. No. 559,744, filed Dec. 9, 1983, entitled "A nonclogging High Speed Rotary Disk Filter for Ultrafiltration", the disclosure of which is incorporated herein by reference.

Referring to FIG. 1, a rotary disk filter assembly indicated generally by the numeral 10 is disclosed. The disk filter assembly 10 includes a plurality of filter disks 11 that have layers with different pore size, all mounted on a hollow shaft 12. The disks 11 are constructed with an inside core 19 that has relatively large pores, while a thin membrane 22 is provided covering the surface of the disks 11 having relatively small pores. The hollow shaft 12 is rotatably mounted within a housing or tank 13. The housing 13 forms a generally fluid tight chamber 14 within which the filter disks 11 are mounted.

During operation, fluid to be filtered enters an inlet 15 into the chamber 14. Waste matter, and some fluid, eventually exits from an outlet 16. A portion of the fluid will pass through the porous filter disks 11 into a passageway 17 in the hollow shaft 12. The filtered fluid eventually exits through a filtrate output 18.

A significant feature of the present invention involves the construction of the filter disks 11.

The filter disks 11 each have relief holes or expungement passageways 60 provided near the shaft 12. These passageways 60 extend through each disk 11, and provide a vertical path 64 to the top 61 of the tank 13. Oil, or other liquids with a low specific gravity which may rise in the slurry, are provided with a relief passageway 64 through which oil droplets 62 or liquid may rise to the top of the tank 13. The tank 13 is preferably provided with a dome-shaped top 61 that acts like a reservoir to collect the rising oil 62, or other liquid or gas, for discharge through the purge output 65.

The filter disks 11 are preferably made from sintered metal particles 21 and 23. For example, the filter disks 11 may be fashioned from compressed sponge iron. The filter elements 11 are porous and allow the passage of fluid through the filter disks 11. Sponge iron in a powered or particulate form may be heated until red hot in a mold conforming to the shape of a filter disk 11. The sponge iron is preferably not heated to its melting point. Pressure is preferably applied to the red hot sponge iron to form the filter disk 11. The objective of this fabrication technique is to form a filter disk 11 which is porous. A description of a porous metal filter is contained in U.S. Pat. No. 4,186,100, issued Jan. 29, 1980, the disclosure of which is incorporated herein by reference.

In the present invention, the disk filters 11 have an internal core 19 with large pores, for example, 20 micron or larger pores. Relatively large passageways 20 are formed between the sintered particles 21 which form the internal core 19. This is best seen in the enlarged cutaway view of FIG. 3. These passageways 20 are not intended to perform significant filtration functions, but are instead intended to freely allow the passage of fluid through the passageways 20 to the passageway 17 in the hollow shaft 12.

The internal core 19 provides structural strength for the filter disks 11. Filter disks 11 formed with such an internal core 19 have superior structural strength as compared to a filter disk with a hollow core. An internal core 19 constructed in accordance with the present invention provides advantages of manufacture.

The filter disk 11 is provided with a thin filter membrane or outer layer 22. The filter membrane 22 is preferably formed from sintered particles 23. Relatively small passageways 24 are formed between the small sintered particles 23 of the filter membrane 22. The passageways 24 are made small, for example on the order of 0.5 microns, not so much for the purpose of excluding undesired particles 63 which may be present in the fluid to be filtered, but to avoid turbulent fluid flow at the surface 25 of the disk 11. The small passageways 24 result in a relatively smooth surface 25 upon the disks 11. The smooth surface 25 prevents an undue amount of turbulence from being induced in the fluid when the disks 11 are spun at high speeds. The elimination of turbulence near the surface 25 of the disk 11 is critical to the establishment of a barrier layer 28.

The filter disk 11 may be manufactured by applying a thin layer of finely powdered material 23 to the internal core 19 which is pressed and adhered to the core 19. This is done for both sides of the core 19 so that the core 19 is surrounded by a thin layer 22. The disk 11 may then be subjected to a controlled temperature (depending on the material) in an inert atmosphere (e.g., nitrogen or argon) to bond or sinter the material 21 together.

A pressure drop will occur across a filter medium with such small passageways 24. For this reason, the filter membrane 22 is preferably made as thin as possible. The pressure drop across the material 21 of the internal core 19 with its large pores 20 is not as great for a given thickness as the pressure drop which occurs across the filter membrane 22 with its relatively small passageways 24. This multilayer construction provides effective filtration and significant structural strength while minimizing the pressure drop across the filter disk 11.

During operation, the shaft 12 and filter disk 11 are rotated at high speeds to accomplish unique filtration action by establishing a barrier layer 28, as described more fully below.

It is necessary to provide a smooth exterior surface 25 on the filter membranes 22. The use of conventional wire mesh is unsatisfactory because wire mesh would cause too much turbulence when the filter disks 11 are rotated at high speeds. Referring to FIG. 4, a substantially smooth exterior surface 25 is provided on the filter membrane 22. The smooth surface 25 avoids the creation of turbulence at the surface 25 of the disks 11 when the disks 11 are rotated at high speed.

The substantially smooth exterior surface 25 permits the formation of a barrier layer 28 in the fluid to be filtered along the surface 25, if the filter disks 11 have a large enough diameter and are rotated at sufficiently high speeds. This barrier layer 28 acts as a barrier to inhibit the passage of particles across the barrier layer 28 to the surface 25 of the filter membrane 22. While the barrier layer 28 inhibits particles from contacting the surface 25 of the disk 11, fluid will diffuse across the barrier layer 28 under appropriate pressure conditions. This unique action prevents small particles from clogging the filter disks 11, and substantially eliminates the need for cleaning operations, and consequently expensive down time.

Breton et al., in U.S. Pat. No. 3,997,447, failed to discover this barrier layer effect. Indeed, Breton et al. teaches away from the present invention by teaching frequent backpulsing. Frequent backpulsing results in turbulent flow which will prevent a barrier layer 28 from being established.

A critical factor involved in the establishment of a barrier layer 28 is the surface velocity of the rotating disks 11. For the outer perimeter of the disks 11, this is directly proportional to the diameter of the disks 11. This may be explained with reference to FIG. 5. That is, in other words, at a constant rpm, the surface velocity at a point "A" on the disk surface 25 is directly proportional to the radius "r" from the axes of rotation 68 of the shaft 12 to such point "A" on the surface 25. The larger the diameter of the disks 11, the lower is the rpm rate at which the barrier layer 28 can be created. If the filter disks 11 are too small, the disks 11 will have to be rotated so fast that the barrier layer 28 may be prevented from forming due to undue turbulence. Thus, for very small diameter disks, for example, the two inch diameter disks described by Breton et al., it may be virtually impossible to create a barrier layer because the disks cannot be turned fast enough to give the required surface velocity without creating too much turbulence.

The speed of rotation may affect the ability to separate oil and water. The disks 11 must have a large enough diameter, so that when the disks 11 are rotated slow enough to permit the oil droplets 62 to pass through the passageways 60 without undue dispersion, the outer perimeter 67 of the disks 11 will have a large enough surface velocity to establish a barrier layer 28 at the given speed of rotation.

Referring to FIG. 5, the surface velocity of a point "A" on the disk 11 is proportional to $2 \pi r$, where "r" is the radius of the point "A" from the center axis 68 of the disk 11. The smaller the radius "r", the faster the rpm's of the disk 11 must be in order to establish a barrier layer 28 at point "A", or other points having a radius which is greater than or equal to "r". If the diameter of the disk 11 is too small, a barrier layer 28 will not be established, and filtration will occur within the membrane 22 of disk 11. This is the type of filtration which results in clogging of the disks 11. Therefore, the disks 11 must have a large enough diameter so that they can be operated over a range of rpm which is fast enough to create a barrier layer 28. For example, the two inch diameter disk described by Breton et al., in U.S. Pat. No. 3,997,447, would probably be too small to accomplish this effect.

It is desirable to develop a positive pressure in the chamber 14 to cause the fluid to diffuse across the barrier layer 28 and through the filter disk 11. If the pressure is too great, the oil droplets 62 will be forced through the disks 11. Thus, the pressure must be operated within a range below the amount of pressure that results in the passage of oil 62 through the disks 11. But if the pressure is not high enough, the flow rate of filtrate out the filtrate output 18 will be too small. At such small flow rates, a filter would not be economically viable.

When the smooth surface disks 11 are rotated at a sufficiently high speed to give the surface 25 of the disks 11 a high surface velocity, which will of course depend upon the diameter of the disks 11, a film of fluid 66 immediately next to the disks 11 will tend to rotate at the same velocity as the disks 11. This is illustrated in FIG. 3. The difference in velocity of this surface film 66 and the remainder of fluid in the chamber 14 occurs at the barrier layer 28. At this point of high velocity shear, many particles 63 are expelled radially outward for eventual discharge as a concentrated stream out the output 16. At high surface velocities, this barrier layer 28 is the location where most of the particles 63 are separated from the fluid. Because most particles 63 do not reach the disk surface 25, such particles 63 cannot clog the filter disks 11.

Because the film 66 immediately adjacent the filter disks 11 rotates with the disks 11, in effect, the infeed at the disks 11 is essentially static. Thus, a "static" layer 66 is formed between the barrier layer 28 and the surface 25 of the disk 11 which is substantially static relative to the rotating disk 11. In other words, the "static" layer 66 rotates with the disk 11 at substantially the same speed. The positive pressure in the interior of the housing 14 urges the fluid into the disks 11. In order to pass through the surface 25 of the rotating disks 11, the fluid in the "static" layer 66 at the surface 25 of the disks 11 must flow in a direction perpendicular to the disk surface 25.

The present invention does not use centrifugal force internal to the disks 11 to achieve particle separation. Particles 63 which might be large enough to be affected by centrifugal force are prevented from traversing the barrier layer 28, so they will not enter the filter disks 11. Such particles 63 cannot accumulate and clog the internal core 19 of the disks 11.

FIG. 3 illustrates the flow patterns of oil droplets 62 under optimum operating conditions. When the disks 11 are spun at high speeds, the fluid tends to flow along flow lines 69 which start from the area between adjacent disks 11 and go in a direction radially inwardly. The fluid then curves and flows back radially outwardly. Solid particles 63 tend to be inhibited from crossing the barrier layer 28, and are expelled radially outwardly. Some fluid will diffuse across the barrier layer 28 and enter the disk 11. The fluid that enters the disk 11 will then flow into the hollow shaft 12 and out the filter 10. As stated previously, the filtration action occurs mainly at the barrier layer 28, not at the surface 25 of the disk 11.

Oil droplets 62 tend to flow radially inwardly in the area that is approximately equidistant from adjacent disks 11. The oil droplets 62 tend to accumulate near the shaft 12 in a area with a low radial velocity. The relief passageways 60 permit the oil droplets accumulating near the shaft 12 to migrate upwardly through the relief holes 60 in the disk 11. Oil droplets 62 from the area below a disk 11 will pass through the passageway 60 in the disk 11 and continue to migrate upwardly near the shaft 12. Such oil droplets 62 will migrate through the relief passageway 64 in the next disk 11 above until it reaches the dome 61 in the housing 13. The oil 62 may be removed from the housing 13 through the purge output 65.

The relief holes 60 in the disk 11 are preferably provided in corresponding alignment so that the holes 60 in one disk 11 are immediately above and in axial alignment with the holes 60 in each disk 11 above and below it.

Referring to FIG. 2, each disk 11 preferably has six relief holes 60, which are equidistantly spaced around the passageway 17 through which the hollow shaft 12 fits. The relief holes 60 are located as close as possible to the shaft 12. It is necessary to locate the relief holes 60 in an area of the disk 11 with a low surface velocity in order to accomplish the desired migration of oil droplets 62 upwardly through the arrangement of rotating disks 11.

In the illustrated embodiment, the disks 11 are separated by spacers 72. The relief holes 60 are provided as close as possible to the surface of the spacers 72.

Referring to FIG. 1, when the filter disks 11 are rotated at high speeds, to some extent a rotational movement will tend to be imparted to the fluid in the tank 14. This rotational movement of the fluid in the tank 14 will develop a centrifugal force which will tend to urge particles, which are in an area 26 between barrier layers 28, radially outwardly toward the surface 30 of the tank 13. This centrifugal force acts external to the filter disks 11.

A significant advantage of the present invention resides in the effectiveness of the barrier layer 28 in separating undesired particles. Filtration is, in effect, accomplished by the barrier layer 28. This phenomenon creates an ability to achieve particle separation of smaller size than the pore size of the filter membrane 22. Clogging is avoided because the barrier layer 28 inhibits particles 63 from ever reaching the filter membrane 22.

A spiral ridge 27 is preferably provided upon the interior surface 30 of the housing 13. The rotational movement imparted to the fluid in the chamber 14 will cause particles to rotate around the surface 30 of the housing 13. The spiral ridge 27 is adapted to guide particles urged toward the surface 30 of the housing 13 generally toward the outlet 16.

A pump (not shown) is preferably provided to pump fluid into the inlet 15. A motor (not shown) is preferably used to rotate the hollow shaft 12.

The core 19 of the disks 11 has relatively large pores on the order of 20 to 100 microns in the illustrated example. The core 19 may be approximately one-quarter inch thick. The thin outer filter membrane 22 is preferably 15 to 20 thousandths of an inch thick, having an average pore size of 2 microns. Pore sizes ranging from 0.5 microns to 10 microns have given satisfactory results. Even larger pore sizes may give satisfactory results.

The shape of the filter disk 11 is preferably a straight smooth concentric disk 11 of parallel wall construction. The shape of the disks 11 could also be tapered. Conical corrugated or ribbed disks may also work. The center of the disk 11 is preferably machined with an appropriately sized shaft hole. In the illustrated example, the machining is accomplished by "E.D.M." electric discharge machining process to insure that the inner porous surface of the core 19 that contacts the shaft ports 70 is not sheared over by normal machining methods, thereby limiting fluid communication.

Suitable materials for the internal core 19 and filter membrane 22 include sponge iron, mild steel, stainless steel and its alloys, nickel and its alloys, e.g., Inconel or Monel, copper and its alloys, e.g., brass, evedure or bronze, Hasteloys, Carpenter 20, tantalum, ferrous and nonferrous metals. Any metal capable of being sintered would be suitable. In a corrosive environment, porous plastic may be preferred. Any material capable of being particlized and then homogeneously bonded to form a porous structure would be suitable. Combinations of the above materials could also be used.

The foregoing discussion frequently refers to the establishment of a barrier layer in the "fluid" that is being filtered. It should be understood that the term "fluid" is defined herein as matter which is generally in a liquid state. The differences between the flow patterns of a gas as opposed to a liquid result in such a high level of unpredictability that no conclusions can be drawn regarding the parameters necessary to establish a barrier layer 28 in a gas. In fact, it is uncertain whether a barrier layer 28 having the characteristics described herein can even be established in a gas which would function to accomplish filtration as achieved by the present invention. It is believed that a disk would have to be rotated at extremely high speeds in a gas. Therefore, the use of rotatable filters in gases, such as Example 4 disclosed by Breton et al., are not considered relevant to the present invention.

While the above discussion has dealt with oil droplets 62, which were used for purposes of describing the operation of the invention, other liquids and gases may be separated in addition to oil in accordance with the principles of this invention. Any liquid which has a specific gravity such that it is lighter than the fluid which is being filtered may be separated. The filter disks 11 are prewetted with the fluid which is desired to be removed through the filtrate output 18. This utilizes the capillary affinity of the liquid, which is sometimes referred to in the art as preferentially wetting the disks 11 with the liquid to be filtered. The small capillary passageways 24 in the membrane 22 are sufficiently small that the cohesive forces of the molecules tend to exclude other liquids from the capillaries 24.

Small bubbles of gas or air may be separated from a liquid in the same manner as the oil droplets 62.

In some cases, a heavier liquid may be allowed to migrate through the relief holes 60 to the bottom of the tank 14. In the case of a heavier liquid, the outlet 16 could function as a purge output at the bottom of the tank 14.

Referring to FIG. 3, the present invention includes the formation of a barrier layer 28 immediately adjacent to at least a portion of the surface 25 of the filter membrane 22. The barrier or barrier layer 28 acts as a barrier to inhibit the passage of particles across the barrier layer 28 to the surface of the filter membrane 22. This unique action prevents such particles from clogging the filter disks 11. This substantially eliminates the need for periodic, high frequency back flushing.

Significantly, the barrier layer 28 itself can accomplish filtration. Particles 63 are prevented from transversing the barrier layer 28. Such particles 63 cannot clog the filter membrane 22 because they cannot reach it. Particle separation can even be achieved of a smaller size than the pore size of the filter membrane 22.

The present invention involves the discovery that high speed rotation could establish what may be described as a barrier layer effect. This barrier layer effect involves the creation of a barrier 28 in the fluid across which many particles 63 cannot pass.

A critical factor involved in the establishment of a barrier layer 28 is the surface velocity of the rotating disks 11. The surface velocity of the disks 11 will depend on the radius "r" of the disk 11 and the rotation speed of the disk 11. This is illustrated in FIG. 5.

For example, for a given point "A" on the surface of a disk 11, the point will travel the distance $2\pi r$ during one revolution of the disk 11. The surface velocity of that point will be related to the distance traveled in one revolution multiplied times the number of revolutions per unit of time.

This relationship may be expressed as:

$$\frac{X 2\pi r}{60}$$

where
X = revolutions per minute of the disk, and
r = the radius in feet.

Division by 60 gives a result expressed in feet per second. In this context, it is believed that a surface velocity of at least 15 feet per second will be needed to establish a barrier layer effect in water, an aqueous solution, or a liquid slurry. Otherwise, a surface velocity of 25 feet per second or greater is preferred.

An appropriate combination of the interrelated parameters of disk diameter and rotational velocity must be used to establish a barrier layer effect within the meaning of the present invention. Such a barrier layer effect cannot be achieved with high frequency backpulsing which would destroy any such barrier layer even if one did form.

In practice, the surface velocity should exceed a critical value needed to establish a barrier layer 28 at some radial distance "$r_1$" which is less than the radius of the disk. This is illustrated in FIG. 6. This may be referred to as the "critical surface velocity." The radius "$r_1$" may be referred to as the "critical radius."

In practice, high speed rotation typically results in an annular effective filtration area, or active area 67, outside the circle 71 defined by the radius $r_1$. The area 73 inside the radius $r_1$ has an insufficient surface velocity to create a barrier layer effect, and will tend to clog. This may be referred to as the blinded area 73. Filtration occurs over the working area 67, and not in the blinded area 73.

If the radius of the disk 11 is too small, the entire disk 11 may lie within the blinded area 73. This was the case with prior art rotary disk filters. In that event, no barrier layer 28 will be created, and frequent backpulsing will be required.

If the speed of rotation is increased, the critical radius "$r_1$" will shrink. Thus, the working area 67 can be increased by increasing the speed of rotation. Conversely, if the speed of rotation is too small, the working area 67 will shrink, or even disappear.

The relief holes 60 may be provided in the blinded area 73 without detracting from the working area 67.

Another way of defining the desirable conditions for establishing a barrier layer 28 is that the product of:

$$\frac{X \pi r_1}{30}$$

should be greater than 15 feet per second if the fluid is water, an aqueous solution or a liquid slurry, and should be greater than 25 feet per second otherwise, where X is the revolutions per minute of rotation of the disk 11, and $r_1$ is the radius of the disk 11, expressed in feet.

The combination of parameters that are utilized in a filter 10 should be within this range to provide satisfactory results. For example, a disk 11 with a diameter greater than 5 inches can be rotated at speeds greater than 700 rpm in a liquid slurry. A disk 11 with a diameter greater than 4 inches can be rotated at speeds greater than 900 rpm in a liquid slurry. Because of unpredictability of the barrier layer effect in gas, as compared with a liquid, the above examples do not apply to gas or air.

The term "boundary layer" was used in Applicant's prior application Ser. No. 400,259, filed July 21, 1982, to refer to the barrier layer phenomenon. But that terminology may be confused, and may be used by others in the art to refer to something else. The more accurate term "barrier layer" is utilized throughout the present application to avoid confusion.

The invention was used to separate oil and brine at various pressures and various oil and brine ratios.

EXAMPLE 1

A rotary disk filter with two 12 inch diameter disks was used in this example. The disks were separated by a distance of ⅜ inch. The outer filter membrane of the sintered metal disks had an average pore diameter of three microns. The oil/brine mixture used was waste water from an offshore drilling rig. The disks were rotated at 600 rpm. The inlet concentration of oil in the tank was measured in parts per million (milligrams per liter) by infrared techniques. The filtrate output of the filtered fluid was measured by both infrared and gravimetric means, showing a dramatic reduction in the amount of oil. The flow rate of filtrate output in gallons per minute was also measured. The efficiency of separation was calculated as the inlet concentration of oil minus the filtrate output concentration of oil all divided by the inlet concentration of oil, times 100 percent.

|  | INFRARED ANALYSIS | GRAVIMETRIC |
|---|---|---|
| Inlet concentration of oil | 200 ppm |  |
| Filtrate output concentration of oil | 3 ppm | 10 ppm |
| Pressure | 20 psi |  |
| Flow rate | 0.59 GPM |  |
| Efficiency of separation | 98.5% | 95% |

EXAMPLE 2

The invention was used in this example to separate oil and brine at the same pressure, and with an increased oil and brine ratio. A rotary disk filter with two 12 inch diameter sintered metal disks was used. The disks were separated by a distance of ⅜ inch. The outer filter membrane of the disks had an average pore diameter of three microns. The oil/brine mixture used was waste water from an offshore production platform. The disks were rotated at 600 rpm. Only infrared measurements were taken.

|  | INFRARED ANALYSIS |
|---|---|
| Inlet concentration of oil | 245 ppm |
| Filtrate output concentration of oil | 4 ppm |
| Pressure | 20 psi |
| Flow rate | 0.59 GPM |
| Efficiency of separation | 98% |

EXAMPLE 3

The invention was used in this example to separate oil and brine at the same 20 psi pressure and with a reduced oil and brine ratio. A sintered metal rotary disk filter with two 12 inch diameter disks was used. The disks were separated by a distance of ⅜ inch. The outer filter membrane of the disks had an average pore diameter of three microns. The oil/brine mixture used was waste water from an offshore production platform. The disks were rotated at 600 rpm. The inlet concentration of oil was measured in parts per million by infrared techniques. The filtrate output concentration of oil was measured by both infrared and gravimetric techniques.

|  | INFRARED ANALYSIS | GRAVIMETRIC |
|---|---|---|
| Inlet concentration of oil | 86 ppm |  |
| Filtrate output concentration of oil | 4 ppm | 12 ppm |
| Pressure | 20 psi |  |
| Flow rate | 0.59 GPM |  |
| Efficiency of separation | 95% | 86% |

EXAMPLE 4

The invention was used to separate oil and brine at a pressure of 25 psi and an oil and brine ratio of 141 ppm. A rotary disk filter with two 12 inch diameter disks was used. The disks were separated by a distance of ⅜ inch. The outer filter membrane of the disks had an average pore diameter of three microns. The oil/brine mixture used was waste water from an offshore production platform. The sintered metal disks were rotated at 600 rpm. Measurements were taken as in the above example. The flow rate of filtrate output increased to 0.68 gallons per minute at a pressure of 25 pounds per square inch in the tank.

|  | INFRARED ANALYSIS | GRAVIMETRIC |
|---|---|---|
| Inlet concentration of oil | 141 ppm |  |
| Filtrate output concentration of oil | 6 ppm | 9 ppm |
| Pressure | 25 psi |  |
| Flow rate | 0.68 GPM |  |
| Efficiency of separation | 96% | 94% |

EXAMPLE 5

In this example, the invention was used to separate oil and brine at an increased pressure of 30 psi while maintaining the oil and brine ratio at 141 ppm. A rotary disk filter with two 12 inch diameter disks was used. The disks were separated by a distance of ⅜ inch. The outer filter membrane of the disks had an average pore diameter of three microns. The disks were made from sintered metal. The oil/brine mixture used was waste water from an offshore production platform. The disks were rotated at 600 rpm. Measurements were taken as in the above example.

|  | INFRARED ANALYSIS | GRAVIMETRIC |
|---|---|---|
| Inlet concentration of oil | 141 ppm |  |
| Filtrate output concentration of oil | 7 ppm | 9 ppm |
| Pressure | 30 psi |  |
| Flow rate | 0.75 GPM |  |
| Efficiency of separation | 95% | 94% |

EXAMPLE 6

The invention was used to separate oil and brine at a pressure of 35 psi with an oil and brine ratio of 141 ppm. A rotary disk filter with two 12 inch diameter sintered metal disks was used. The disks were separated by a distance of ⅜ inch. The outer filter membrane of the disks had an average pore diameter of three microns. The oil/brine mixture used was waste water from an offshore production platform. The disks were rotated at 600 rpm. Measurements were taken as above.

|  | INFRARED ANALYSIS | GRAVIMETRIC |
|---|---|---|
| Inlet concentration of oil | 141 ppm |  |
| Filtrate output concentration of oil | 6 ppm | 10 ppm |
| Pressure | 35 psi |  |
| Flow rate | 0.88 GPM |  |
| Efficiency of separation | 96% | 93% |

EXAMPLE 7

The invention was used to separate oil and brine at an increased pressure and a 141 ppm oil and brine ratio. A rotary disk filter with two 12 inch diameter disks was used. The sintered metal disks were separated by a distance of ⅜ inch. The outer filter membrane of the disks had an average pore diameter of three microns. The oil/brine mixture used was waste water from an offshore production platform. The disks were rotated at 600 rpm. Measurements were taken as above.

|  | INFRARED ANALYSIS | GRAVIMETRIC |
|---|---|---|
| Inlet concentration of oil | 141 ppm |  |
| Filtrate output concentration of oil | 5 ppm | 8 ppm |
| Pressure | 40 psi |  |
| Flow rate | 0.94 GPM |  |
| Efficiency of separation | 96% | 94% |

EXAMPLE 8

The pressure was increased to 45 psi, and the invention was used to separate oil and brine at an oil and brine ratio of 141 ppm. A rotary disk filter with two 12 inch diameter disks was used. The sintered metal disks were separated by a distance of ⅜ inch. The outer filter membrane of the disks had an average pore diameter of three microns. The oil/brine mixture used was waste water from an offshore production platform. The disks were rotated at 600 rpm. Measurements were taken as above.

|  | INFRARED ANALYSIS | GRAVIMETRIC |
|---|---|---|
| Inlet concentration of oil | 141 ppm |  |
| Filtrate output concentration of oil | 7.4 ppm | 9.8 ppm |
| Pressure | 45 psi |  |
| Flow rate | 1.07 GPM |  |
| Efficiency of separation | 95% | 93% |

EXAMPLE 9

The invention was used to separate oil and brine using a mixture having a large oil and brine ratio. A rotary disk filter with two 12 inch diameter sintered metal disks was used. The disks were separated by a distance of ⅜ inch. The outer filter membrane of the disks had an average pore diameter of three microns. The oil/brine mixture was created by mixing crude oil with water. The inlet concentration of oil was not measured, but was calculated by taking a known quantity of oil and mixing it with a known quantity of water. The disks were rotated at 600 rpm. Only infrared measurements were taken of the filtrate output.

|  | INFRARED ANALYSIS |
|---|---|
| Inlet concentration of oil | 6,666 ppm |
| Filtrate output concentration of oil | 10*ppm |
| Pressure | 20 psi |
| Flow rate | 0.59 GPM |
| Efficiency of separation | 99.8% |

EXAMPLE 10

In this example, a rotary disk filter was used at varying pressures to separate an oil and brine mixture. Twelve inch diameter sintered metal disks were used having an average pore size of one to three microns. The disks were rotated at 500 rpm. The applied pressure was measured in the chamber that houses the disks. The inlet concentration of oil generally remained constant at 46 parts per million. The pressure (in psi) and filtrate output concentration of oil (in parts per million) are given in a table.

| Pressure | Filtrate Output |
|---|---|
| 25 psi | 2 ppm |
| 35 psi | 7 ppm |
| 45 psi | 14 ppm |
| 65 psi | 29 ppm |

EXAMPLE 11

The invention has been used satisfactorily to separate concentrations of oil and water as high as 10% oil and 90% water. In this example, twelve inch diameter sintered metal disks were rotated at 700 rpm at a pressure of 50 psi. No backflushing was required. The test was run for approximately 4 hours per day for 5 days.

EXAMPLE 12

In this example, porous plastic disks were used for low concentration oil and water separation. In many cases, it is more difficult to efficiently filter low concentrations than to filter high concentration mixtures. A low concentration mixture with a concentration of oil to water of 14.7 ppm was filtered. The porous plastic disks had a pore size of 10 to 15 microns. The disks had a diameter of 12¾ inches. The disks were rotated at 400 rpm.

| Pressure | Filtrate Output |
|---|---|
| 20 psi | 0.6 ppm |
| 40 psi | 1.6 ppm (average) |
| 50 psi | 3.0 ppm |

| Pressure | Filtrate Output |
|---|---|
| 60 psi | 4.9 ppm |

It will be appreciated from the above discussion that practice of the invention requires observance of several operating parameters. The pore size of the disks, and the relationship of the particle size in the fluid being filter, are important considerations for nonclogging operation of the filter. The percentage of oil or other liquid present in the fluid to be filtered, and what is used to prewet the membrane of the disks, should be considered. The pressure should be maintained in a range sufficient to provide adequate flow rates without forcing too much oil into the disks.

The most critical factors are the interrelated factors of disk size and rotational speed of the disks. For the establishment of a barrier layer, these two factors are of crucial importance. The critical condition for establishing a barrier layer is proportional to the radius of the disks and the rpm of the disks and is inversely proportional to the applied pressure. This critical condition is best expressed as a required minimum surface velocity for the disk of at least 15 feet per second for a liquid, where the pressure is maintained within a proper range as shown by the examples herein. If the surface velocity is in the lower portion of the above acceptable range, then the pressure must be lower. If frequent backpulsing is needed, for example, in excess of 10 times an hour, then that is an indication that the required barrier layer has not been successfully formed. In that event, the above parameters of disk size or rotational speed must be increased, the pressure decreased, or a combination of the above. It may also be helpful to adjust the pore size to particle size in some cases.

SUMMARY OF ADVANTAGES

The invention disclosed herein is capable of achieving certain advantages. It can handle varying concentrations of two liquids, and even sudden surges in concentration, without adjustment. A wide range of concentrations and variation in the feed stream are permitted with the present invention. Ultrafiltration of small particles may be accomplished, while at the same time separating oil and gas from water, for example. The invention will handle mixtures having small concentrations of fluid to be filtered. The invention is compact, and weighs less for a similar capacity filter of a different design. Wide differences in the densities of the two liquids to be separated is not required. The invention minimizes or eliminates clogging of the filter elements. It minimizes filter element replacement and expensive downtime. It reduces pumping requirements and back pressure.

It will be understood that the above examples and description of a presently preferred embodiment are given for purposes of enabling a person skilled in the art to make and use the invention. The invention is not to be limited to the described examples only. Rather, several modifications of the invention, and different combinations of parameters will occur to those skilled in the art, after having the benefit of this disclosure. The invention is to be accorded the full range of protection provided by a proper construction of the claims which follow. The invention is not be limited to the specific embodiments disclosed herein, but includes modifications and changes which are within the spirit and scope of the invention.

What is claimed is:

1. A process for separating particles from a fluid mixture, comprising the steps of:
   constructing a rotatable disk filter having a plurality of porous disks that have a diameter greater than 4 inches, the porous disks being mounted on a rotatable shaft and being made from sintered particles;
   providing smooth surfaces on the disks to minimize turbulence when the disk filter is rotated at high speed;
   immersing the disk filter in a fluid mixture which includes particles to be separated from a fluid mixture;
   rotating the disk filter at a sufficiently high velocity so that the disks have working areas on said surfaces, said working areas rotating at velocities greater than 15 feet per second;
   forming barrier layers as planar layers in nonturbulent zones of the mixture which are generally parallel to said working areas;
   forming first zones between said barrier layers and said working areas of said surface containing a component of said fluid mixture including a first liquid, said liquid contained in said first zones rotating at generally the same velocities as said working areas;
   forming second zones, separated from said first zones by said barrier layers and remote from said working areas, containing a component of said fluid mixture, including a mixture of said first liquid and particles, which moves at velocities substantially slower than said rotational velocities of said first liquid contained in said first zones;
   allowing said fluid mixture to enter said second zones;
   inhibiting a migration of particles across said barrier layers from said second zones to said first zones to minimize clogging of said surfaces of said disks; and separating particles from the fluid mixture by passing said first liquid through said barrier layers and through passageways between said sintered particles in said disks.

2. The process according to claim 1, further comprising the steps of:
   constructing relief holes in the porous disks near the rotatable shaft; and
   allowing a second liquid components or a gas component of the fluid mixture to migrate through the relief holes to a purge output for the rotatable filter.

3. The process according to claim 1, further comprising the step of:
   removing particles from said second zones by establishing a centrifugal force that urges particles generally away from the disk filter.

4. The process according to claim 1, further comprising the step of:
   concentrating particles in said second zones in areas between said barrier layers of adjacent rotating disks to facilitate removal of the particles.

* * * * *